United States Patent Office 3,694,316
Patented Sept. 26, 1972

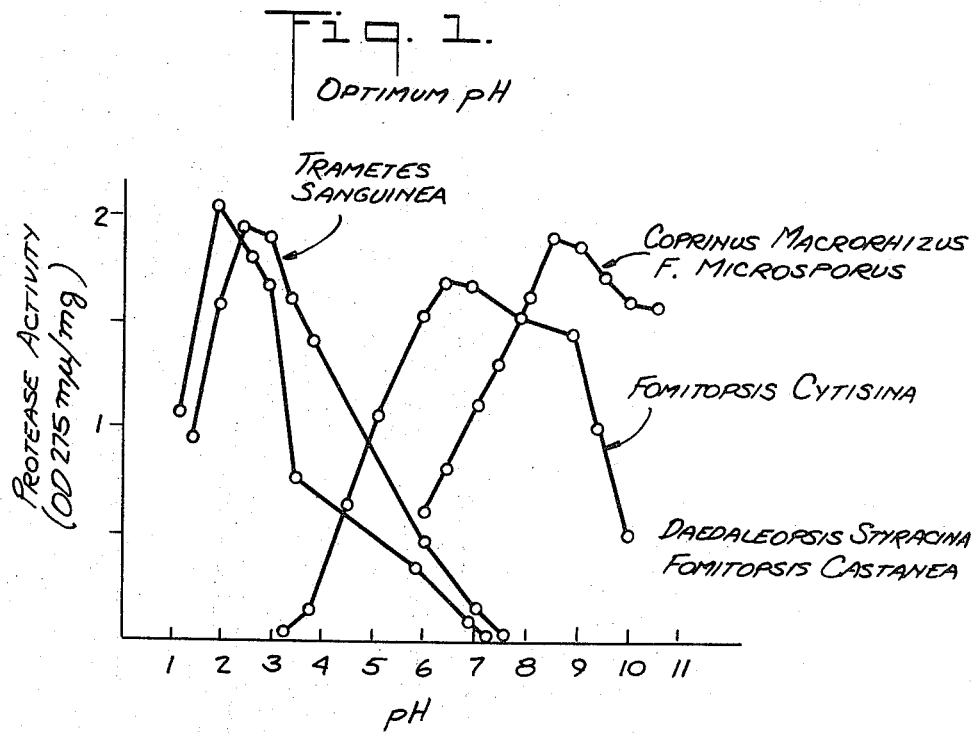
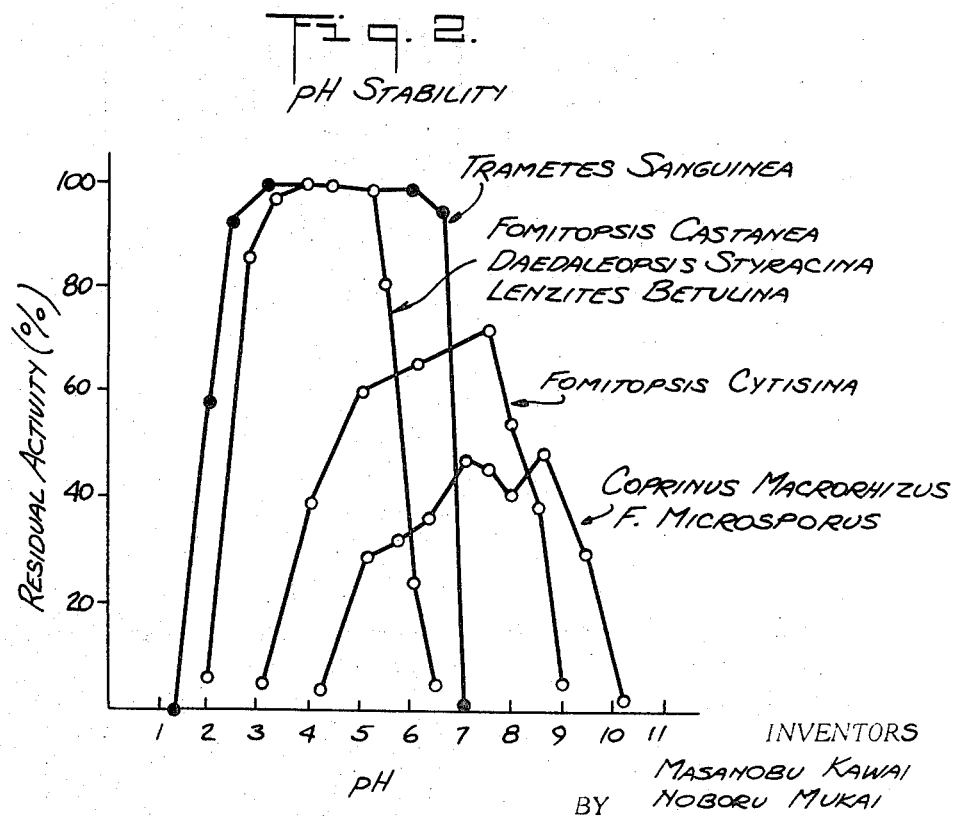

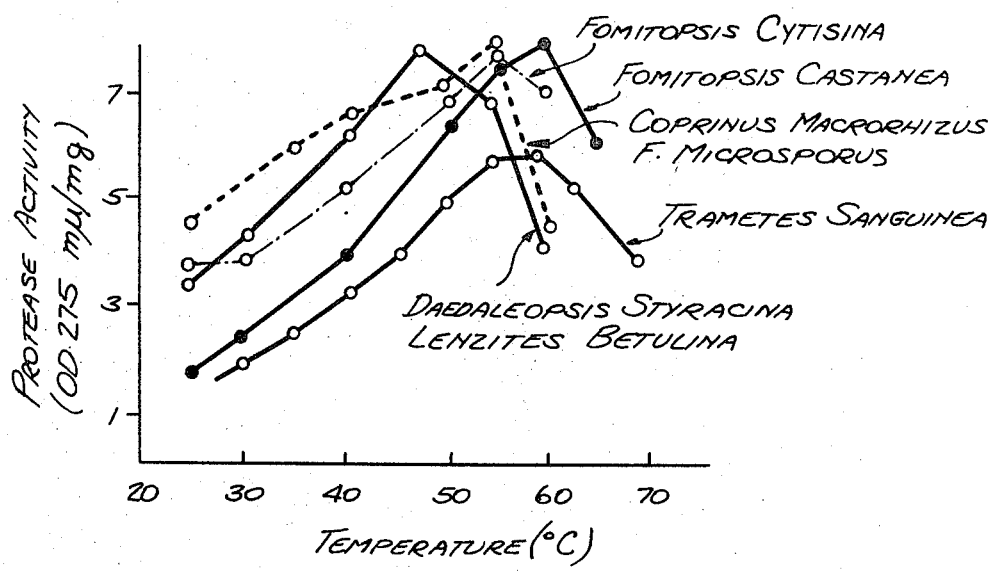
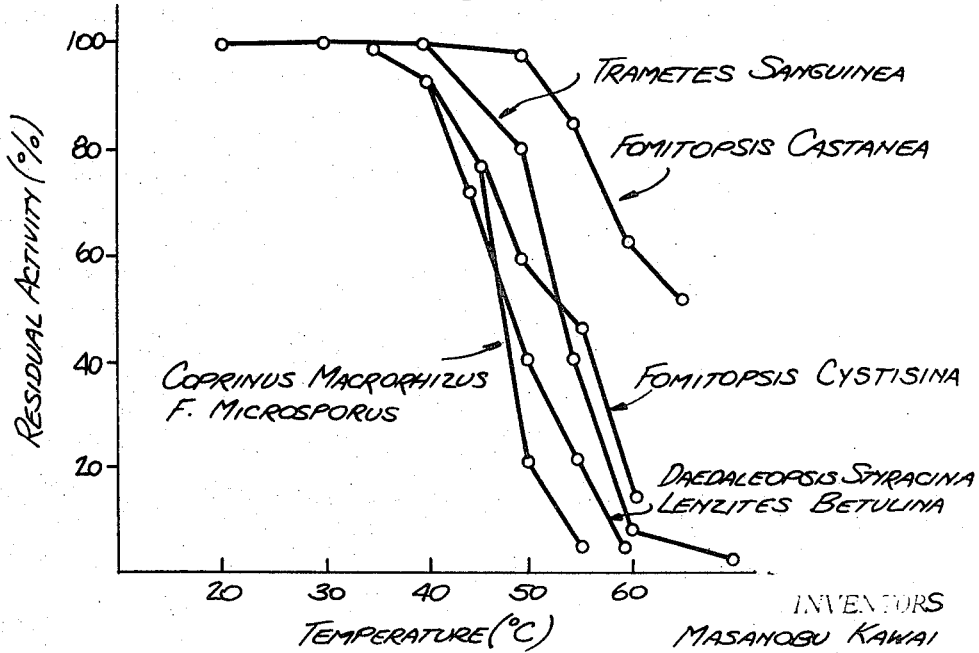

3,694,316
PROCESS FOR PREPARING PROTEASE BY MICROORGANISM OF THE BASIDIOMYCETES
Masanobu Kawai and Noboru Mukai, Tokyo, Japan, assignors to Kyowa Hakko Kogyo Co., Ltd.,
Filed Dec. 31, 1969, Ser. No. 889,659
Claims priority, application Japan, Jan. 11, 1969,
44/2,963
Int. Cl. C12d 13/10
U.S. Cl. 195—66 R    4 Claims

ABSTRACT OF THE DISCLOSURE

Protease is produced by fermentation of organisms in the class Basidiomycetes. Addition of distillers solubles to the medium improves the yield. Protease having good activity and freedom from undesirable tastes and odors is obtained.

---

This invention relates to a process for preparing protease by culturing microorganisms of the class Basidiomycetes in a culture medium containing a suitable carbohydrate, a nitrogen source, inorganic salts and other nutrient materials.

A large number of proteases having various properties such as those of animal origin, those of vegetable origin, those of microorganism origin, etc. have been known. However, with regard to microorganisms of the class Basidiomycetes, only the enzyme produced by the genus Trametes has been recognized. This is because microorganisms of the class Basidiomycetes, unlike other microorganisms, have been heretofore mainly used only for culturing some of the edible mushrooms in an agricultural sense, and studies of metabolic products have almost never been made.

The present invention is based on the surprising finding that microorganisms of the class Basidiomycetes other than those of the genus Trametes produce a considerable quantity of protease having novel properties.

In the accompanying drawings, FIG. 1 is a graph showing the relationship between enzyme activity and pH for protease enzymes produced by the noted organisms. FIG. 2 shows the residual enzyme activity observed when each of the enzymes is permitted to stand overnight at 30° C. FIG. 3 shows the relationship between enzyme activity and temperature. FIG. 4 illustrates the heat stability of the enzymes, in terms of the residual activity observed after heating them for 10 minutes at the noted temperature. (Protease activities in FIG. 1 and FIG. 3 were measured by Kunitz's method described in Agricultural and Biological Chemistry (Agr. Biol. Chem.) volume 28, No. 11, page 770–771 (1964)).

The properties of the enzymes obtained according to the present invention are given below:

As shown in FIG. 1, the optimum pH of the enzymes fall into three ranges, 2.0–2.5 or 6–7 or 8–9, and an enzyme having an optimum pH within any one of these ranges can be obtained as desired, by proper selection of the strain or culturing conditions. Metal ions other than calcium are not necessary for protecting or promoting the enzyme activity, but the enzyme having the optimum pH of 2–2.5 is inhibited by EDTA and the enzyme having the optimum pH of 8–9 is inhibited by para-chloromercuribenzoic acid (PCMB). The pH stability, the optimum temperature and heat stability of the present enzyme are shown in FIG. 2, FIG. 3 and FIG. 4, but it is seen from these properties that the present enzyme is clearly different from the enzymes produced by the genus Tramates. The properties of the enzyme of the genus Trametes are found in Agricultural and Biological Chemistry, volume 28, p. 774 (1964).

The use of protease enzymes has been extended by the developments in the food industry and demand for them has been remarkably increased. In this field, merely higher decomposing activity is not sufficient, and it is necessary that the enzyme have no toxicity and that it imparts no offtaste or bitter taste or unpalatable flavor to foods or beverages. In this respect, the enzymes produced by microorganisms of the class Basidiomycetes in accordance with the present invention, differ from those of other animal, vegetable or microorganism origin, in that the enzymes of the invention are free of undesirable flavors and also possess other very advantageous properties.

Any strains can be used in the present invention, so long as the strains are of a microorganism of the class Basidiomycetes, but the strains belonging to the genus Daedaleopsis, the genus Irpex, the genus Lenzites, the genus Fomitopsis and the genus Coprinus are particularly preferable. Illustrative examples of these preferred strains are *Daedaleopsis styracina, Daedaleopsis nipponica, Irpex lacteus, Lenzites betulina, Fomitopsis castanea, Fomitopsis pinicola, Fomitopsis cytisina, Coprinus macrorhizus* f. *microsporus, Coprinus radians*, etc. The above-mentioned strains are based on the description of Rokuya Imazeki and Tsuguo Hongo: "Genshoku Nihon Kinrui Zukan (Colored Japanese Mushrooms Illustrated)", but these strains may be identified under different names according to the differences in classifying procedures or descriptive procedures, but any strains as classified above according to the Imazeki et al. classification can be used.

According to the present process, the microorganism of the class Basidiomycetes is cultured in a medium; either a liquid or solid medium can be used. Usually it is advantageous to use the liquid medium. In that case, stationary cultures or aerated stirred cultures can be used.

The medium must contain nutritional sources which can be utilized by the particular microorganism. Generally, carbohydrates such as sucrose, dextrose, maltose, lactose, starch, dextrin, blackstrap molasses, etc. are used as a carbon source. As a nitrogen source, for example, inorganic or organic nitrogen-containing materials such as ammonium salts, nitrate salts, peptone, meat extract, cornsteep liquor, soybean cake, wheat flour, yeast, urea, etc., can be used. In addition, inorganic materials or metal salts such as phosphates, potassium salts, magnesium salts, iron salts, zinc salts, etc. may be used. Further, vitamins, growth-promoting agents, etc. can be also added. It is possible to obtain a considerable yield of protease by adding distillers solubles to the medium.

In culturing the microorganism of the class Basidiomycetes, the culturing conditions will vary somewhat depend upon the strain to be used, the composition of the medium, etc., but generally the accumulation of protease reaches a maximum by carrying out culturing at a culturing temperature of 20–35° C. and a pH of 4–7 in the medium for 48 to 120 hours. Of course, it is generally preferred to choose conditions which provide the maximum yield of protease.

The protease obtained according to the present invention can be precipitated and concentrated by adding 50–65% (volume/volume) of an organic solvent, for example, acetone, alcohol, etc. or 40–70% (weight/volume) of a precipitating agent, for example, ammonium sulfate, calcium chloride, sodium chloride, etc. to a water-extract solution in the case of solid cultures or a culture filtrate in the case of liquid cultures. These can be further readily purified according to the ordinary procedure such as dialysis, or absorption, desorption, etc. by ion exchange resin.

The present invention is further illustrated by the following specific examples:

EXAMPLE 1

A medium having a composition of 3% sucrose, 3% soybean powders, 0.3% yeast extract, 0.5% $KH_2PO_4$ and 0.02% $MgSO_4 \cdot 7H_2O$ was adjusted to pH 6.0, and *Daedaleopsis styracina* (ATCC 20188), *Irpex lacteus* (ATCC 20123), *Lenzites betulina* (ATCC 11575), *Fomitopsis castanea* (ATCC 20234), *Formitopsis cytisina* (ATCC 20196), *Fomitopsis pinicola* (ATCC 20036), *Coprinus macrorhizus* f. *microsporus* (ATCC 20120) and *Coprinus radians* (ATCC 20014) were inoculated separately onto separate. 30 ml. portions of the medium, and cultured with shaking at 28° C. for 48–72 hours. These cultures were used as seed cultures to inoculate separate 15 l. portions of media having the same composition as above respectively and cultured with stirring under aeration at 28° C. for 48–96 hours.

The culture liquors were filtered to remove cells, and ammonium sulfate was added with gentle stirring to the filtrates so that the final ammonium sulfate content was 60% (weight/volume) and left standing at 0° C. for 4 hours. After addition of 2% of filter aid, the resulting precipitates were filtered off and dissolved in a small amount of water. By filtering the precipitates again, clear, dark brown filtrates were obtained. The filtrates were dialyzed at 0° C. overnight, and yellowish brown powders were obtained by freeze-drying the dialysate. The activities of the powders were measured according to the procedure described in "Koso Kenkyuho (Procedures for studying enzyme)," vol. 2 compiled by Shiro Akabori, and the results are given below:

| Strains used | Yield (grams) | Activity (PU/grams) |
| --- | --- | --- |
| *Daedaleopsis styracina*, ATCC 20188 | 20 | 60,000 |
| *Irpex lacteus*, ATCC 20123 | 22 | 80,000 |
| *Lenzites betulina*, ATTC 11575 | 9 | 25,000 |
| *Fomitopsis castanea*, ATTC 20234 | 19 | 40,000 |
| *Fomitopsis cytisina*, ATCC 20196 | 21 | 15,000 |
| *Fomitopsis pinicola*, ATCC 20036 | 24 | 19,000 |
| *Coprinus macrorhizus* f. *microsporus*, ATCC 20120 | 32 | 25,000 |
| *Coprinus radians*, ATCC 20014 | 25 | 20,000 |

EXAMPLE 2

The fermentation liquors obtained by culturing the same strains in the same media in the same manner as in Example 1 were filtered to remove cells and the resulting filtrates were cooled to 0° C. Actone which was cooled to −20° C. in advance was slowly added to each of the filtrates so that the final acetone content was 65% (v./v.), and a precipitate was formed. The water entrained in the precipitates was pressed and the precipitates were collected by filtration. The precipitates were washed once with ether and vacuum-dried, whereby dark brown powders were obtained. Their activities, measured as described above are given below:

| Strains used | Yield (grams) | Activity (PU/grams) |
| --- | --- | --- |
| *Daedaleopsis styracina*, ATCC 20188 | 130 | 5,000 |
| *Irpex lacteus*, ATCC 20123 | 115 | 11,000 |
| *Lenzites betulina*, ATCC 11575 | 180 | 1,500 |
| *Fomitopsis castanea*, ATCC 20234 | 195 | 1,200 |
| *Fomitopsis cytisina*, ATCC 20196 | 210 | 600 |
| *Fomitopsis pinicola*, ATCC 20036 | 230 | 700 |
| *Coprinus macrorhizus* f. *microsporus*, ATCC 20120 | 170 | 1,800 |
| *Coprinus radians*, ATCC 20014 | 130 | 1,400 |

EXAMPLE 3

A medium containing 3% sucrose, 2% soybean cake, 0.5% distillers solubles, 0.5% defatted rice bran, 0.8% $KH_2PO_4$ and 0.1% $MgSO_4 \cdot 7H_2O$ was adjusted to pH 5.5 and the same strains used in Example 1 were inoculated onto separated 30 ml. portions of the medium and cultured with shaking at 30° C. for 48–96 hours. As a control, culturing was also effected in the same manner in media which were identical except that they contained no distillers solubles. The activities of the filtrates obtained by filtration of culture broth were measured by modified Anson's method described in Agr. Biol. Chem. vol. 31, p. 542 (1967) and the results are given below:

| | Activity (OD 660 mμ/ml.) | |
| --- | --- | --- |
| Strains used | No distillers solubles added | Distillers solubles added |
| *Daedaleopsis styracina*, ATCC 20188 | 0.540 | 1.080 |
| *Irpex lacteus*, ATCC 20123 | 0.950 | 1.900 |
| *Lenzites betulina*, ATCC 11575 | 0.760 | 1.400 |
| *Fomitopsis castanea*, ATCC 20234 | 0.435 | 0.870 |
| *Fomitopsis cytisina*, ATCC 20196 | 0.780 | 1.460 |
| *Fomitopsis pinicola*, ATCC 20036 | 0.860 | 1.600 |
| *Coprinus macrorhizus* f. *microsporus*, ATCC 20120 | 0.585 | 1.070 |
| *Coprinus radians*, ATCC 20014 | 0.470 | 0.910 |

EXAMPLE 4

Wheat bran, defatted rice bran and distillers solubles were mixed in a proportion of 10:1:1, and sterilized after being sufficiently wetted with water. Mycelial forms of the respective strains cultured in the same media as in Example 1 were separately and uniformly sprayed onto the thus prepared solid media and cultured at 28° C. for 7 to 10 days. After culturing, the solid media were pulverized and suspended in water of 5 times the volume. The enzyme was extracted at room temperature for 4 hours with gentle stirring. The activities of the filtrates obtained by filtration are given below:

Strains used               Activity (OD 660 mμ/ml.)

*Daedaleopsis styracina* ATCC 20188 — 0.810
*Irpex lacteus* ATCC 20133 — 1.520
*Lenzites betulina* ATCC 11575 — 0.980
*Fomitopsis castanea* ATCC 20234 — 0.730
*Fomitopsis cytisina* ATCC 20196 — 1.020
*Fomitopsis pinicola* ATCC 20036 — 1.120
*Coprinus macrorhizus* f. *microsporus* ATCC 20120 — 0.660
*Coprinus radians* ATCC 20014 — 0.520

What is claimed is:

1. A process for producing alkali protease which comprises culturing an organism belonging to the genus Coprinus in a culture medium containing assimilable carbohydrate and nitrogen source, accumulating said alkali protease in said culture medium and separating and recovering said alkali protease.

2. The process of claim 1 wherein said medium contains distillers solubles.

3. The process of claim 1 wherein said organism is *Coprinus macrorhizus* f. *microsporus*.

4. The process of claim 1 wherein said organism is *Coprinus radians*.

References Cited

UNITED STATES PATENTS 3,607,655   9/1971   Mukai et al.    195—66 R
3,097,145   7/1963   Shimazono et al.    195—66 R

OTHER REFERENCES

Banno et al., Chemical Abstracts, 71 48329g (1969).
Ozaki et al., Chemical Abstracts, 65 1344g–1345a (1966).

LIONEL M. SHAPIRO, Primary Examiner